United States Patent [19]

Fieback et al.

[11] Patent Number: 5,896,914

[45] Date of Patent: Apr. 27, 1999

[54] HEATER

[75] Inventors: Klaus Fieback, Berlin; Lutz Kutzker, Fürstenwalde; Thomas Krämer, Adelsheim; Michael Matthäi, Henstedt-Ulzburg; Günter Hildebrand, Rehmsdorf, all of Germany

[73] Assignee: ST Speicher-Technologie GmbH, Fürstenwalde, Germany

[21] Appl. No.: 08/669,436

[22] PCT Filed: Jun. 3, 1994

[86] PCT No.: PCT/EP94/01806

§ 371 Date: Jun. 27, 1996

§ 102(e) Date: Jun. 27, 1996

[87] PCT Pub. No.: WO95/01542

PCT Pub. Date: Jan. 12, 1995

[30] Foreign Application Priority Data

Jun. 29, 1993 [DE] Germany .............. 43 21 457
Jul. 17, 1993 [DE] Germany .............. 43 23 997
Jan. 25, 1994 [DE] Germany .............. 44 02 062

[51] Int. Cl.⁶ .................................................... F28D 17/00
[52] U.S. Cl. .................... 165/10; 165/49; 165/236; 165/130; 165/904; 252/70
[58] Field of Search ............................. 165/130, 904, 165/10, 49, 56, 236; 252/70

[56] References Cited

U.S. PATENT DOCUMENTS

| | | | |
|---|---|---|---|
| 2,936,741 | 5/1960 | Telkes | 165/10 |
| 3,293,409 | 12/1966 | Snelling | 165/10 X |
| 3,532,856 | 10/1970 | Collins | 165/10 X |
| 3,743,782 | 7/1973 | Laing | 165/10 X |
| 3,773,031 | 11/1973 | Laing et al. | 165/10 X |
| 3,825,059 | 7/1974 | Laing | 165/10 X |
| 3,953,973 | 5/1976 | Cheng et al. | 165/236 X |
| 4,100,092 | 7/1978 | Spauschus et al. | |
| 4,168,740 | 9/1979 | Cairenius | 165/49 |
| 4,241,782 | 12/1980 | Schoenfelder | |
| 4,273,100 | 6/1981 | Cogliano | 165/10 X |
| 5,270,550 | 12/1993 | Martorana et al. | 165/10 X |
| 5,290,904 | 3/1994 | Colvin et al. | 165/10 X |

FOREIGN PATENT DOCUMENTS

| | | | |
|---|---|---|---|
| 2741829 | 3/1979 | Germany . | |
| 236862 | 6/1986 | Germany . | |
| 280113 | 6/1990 | Germany . | |
| 4122859 | 1/1992 | Germany . | |
| 4342020 | 12/1993 | Germany . | |
| 4307065 | 6/1994 | Germany . | |
| 0058087 | 4/1982 | Japan | 165/10 |
| 0175892 | 10/1982 | Japan | 165/10 |
| 2143025 | 1/1985 | United Kingdom . | |
| 2183326 | 6/1987 | United Kingdom . | |

OTHER PUBLICATIONS

Patent Abstracts of Japan, vol. 9, No. 209 (M–407) Aug. 27, 1985 & JP, A, 60 069 491 (Matsushita Denki Sangyo KK) Apr. 20, 1985.

Patent Abstracts of Japan, vol. 16, No. 141 (M–1232) Apr. 9, 1992 & JP, A,04 000 187 (Sotaro Osato) Jan. 6, 1992.

Solar Energy, vol. 30, No. 4, 1993, Oxford GB, pp. 313–332, Abhat low temperature latent heat thermal energy storage.

Primary Examiner—Ira S. Lazarus
Assistant Examiner—Christopher Atkinson
Attorney, Agent, or Firm—Martin A. Farber

[57] ABSTRACT

The invention relates to a heater (1) for use in a room of a dwelling, preferably with a convection surface (3) and, in the case, for example, of a hot-water heater, with a water tank with an inlet and an outlet aperture. To obtain a design more advantageous concerning the use, the heater according to the invention has a separate closed storage chamber (7) containing a latent heat storage medium (8), the storage chamber (7) being heatable by radiation, convection or electrically.

22 Claims, 4 Drawing Sheets

5,896,914

HEATER

FIELD AND BACKGROUND OF THE INVENTION

The present invention relates to a heater for use in a room of a dwelling, having a convection surface and in the case, for example, of a hot water heater, a water tank provided with an inlet opening and an outlet opening.

Many embodiments of such heaters are known, for example, as plate heaters or as ribbed radiators, each of which has a considerable radiation surface. In addition, heaters which are optimized with respect to the transmission of heat by convection are also known. They consist, for instance, of fin-like sheet-metal elements which are located closely alongside of each other and are, for instance, arranged in a row on a pipe which passes axially through said sheet-metal elements.

Furthermore, heaters for night storage heating are also known in which a heat storage medium, generally a stone body of high thermal capacitance, is heated during the night by, for instance, electric energy and then gives off heat throughout the day to the room which is to be heated by radiation and convection.

In the case of these known heaters, there can be noted either only a small heat capacity or discomfort as a result of high storage temperatures. In said night storage heaters, the temperature of the heat storage furthermore decreases with increasing liberation of heat. While initially, at high temperatures, there may also, for instance, be a burning of dust and the giving off of odors, this system passes only for a comparatively short period of time through a condition in which heat which is found comfortable is given off.

A certain "tiled stove effect" is sought in the case of such heaters. Heat is to be given off continuously by radiation and convection from surfaces which do not have too high a temperature. Even when there is no further feeding of energy to the heater, as a result, for instance, of the reduction at night in the case of central heating systems, a release of heat which does not drop below the limit of comfort is to be given off still for a certain period of time. This applies in the same way to a temporary priority switching of the heating system to the heating of hot water.

In water heating systems this cannot be obtained due to the fact that the heat-storage capacity is, as a rule, slight. In modern heating systems, the heat storage capacity is particularly low as a result of very small filling volumes. It has also already been proposed to hang in front of heaters ceramic tiles which have a certain, although to be sure slight capacity. They, it is true, provide a certain improvement but they are by far not satisfactory.

SUMMARY OF THE INVENTION

This technical problem is solved by the invention by a separate, closed storage chamber containing a latent heat-storage medium, the storage chamber being at least in radiation heat exchange or convection heat exchange with the convection surface. Therefore, a new type of heater is provided which comprises both a latent heat storage and of a traditional heater structural part. It is essential that the latent heat storage be heated during the course of a normal heating process. If the supply of the heat of the actual heater, for example heaters for the heating of hot water, is shut off, for instance, during the course of a night-time reduction, then the heater nevertheless continues to give off heat from the storage chamber for a comparatively long period of time.

Since the storage chamber is filled with latent heat storage material, there is also the effect that the heat is given off practically without any substantial reduction in temperature until the phase conversion of the latent heat storage medium which forms the basis of the latent heat storage is concluded. The arrangement of the storage chamber relative to a convection surface of a traditional heater can be effected in such a manner that the two elements are arranged, with surfaces facing each other, at a certain distance from each other. They are thus substantially in a radiation heat exchange. Upon increase of the temperature of, for instance, the water heater, the storage chamber with the latent heat storage medium is also heated. In addition, it is naturally also possible for the latent heat storage to be integrated directly in the heater and for hot water to flow for instance around the outside of it. The latent heat storage can also be arranged in direct surface contact with, for instance, a plate heater. In addition, the partition wall of the latent heat storage can at the same time be the partition wall of the plate heater so that latent heat storage medium is present on one side of this (intermediate) wall, while water of the heater flows on the other side. In the case of a convection heater element, the storage chamber can also be arranged, for instance, above this heater element so that the rising heated air gives off heat by convection to the storage chamber. In detail, it is possible to develop the storage chamber both as a dynamic latent heat storage and as a static latent heat storage. With respect to a static latent heat storage, reference may be had, for instance, to the prior art in accordance with Federal Republic of Germany A1 27 41 829. Within the scope of the invention described here, it is advisable, with respect to a static latent heat storage, to provide a storage chamber which is completely filled with latent heat storage medium, for instance one having a base of paraffin. With respect to the dynamic latent heat storages, reference is had, for instance, to prior art such as known from DD 23 68 62 and DD 28 01 13. In this connection, reference is also had to Federal Republic of Germany A1 41 22 859. With respect to storage mediums having a base of paraffin which are suitable for this, reference is had to the non-previously published patent application 43 07 065.5. The content of patent application 43 07 065.5 (cf. parallel serial No. 08/446,673) is herewith included in its entirety by incorporation by reference in the disclosure of the present application. For better heat transport in the storage chamber it is also proposed that a heat-conductive grid which is connected with the chamber walls of the storage chamber, particularly a metal grid, be arranged within the storage chamber. Such a metal grid, in connection with which several layers may also be provided, improves the possibility of the storage chamber to continuously store and discharge the heat of the latent storage material. This is of importance, in particular, with respect to a faster storage of heat, since in this way the thermal conductivity of the latent heat storage medium, which in itself is poor, for instance if it has a base of paraffin, is counteracted. As a further development, it is provided that the storage chamber be developed spaced from the convection surface (of the actual heater) and in its turn form a storage convection surface. In this connection, it is advisable for the storage chamber to be adapted geometrically to the shape of the heater convection surface. Furthermore, the storage chamber can be arranged between two convection surfaces of the heater. A preferred development is, for instance, also obtained in the manner that the storage chamber is developed in the form of a plate body, corresponding to a plate heater. It is also advisable for the storage chamber to be arranged on the room side with respect to a convection surface of the heater. It is also advisable, for a dynamic formation of the latent heat storage, to add to the latent heat storage medium a heat-transport agent, for instance in the form of an oil. For this purpose, a paraffin which has been deoiled or not completely deoiled upon manufacture can be used. In detail, reference with respect to this is also had to the aforementioned German Patent Application P 43 07 065.5. In addition, there is also suitable as heat transfer agent a fire-extinguishing agent such as, for instance, carbon tetrachloride, or a comparable chlorine-free fire-extinguishing agent. A latent heat storage medium having a base of paraffin containing a heat-transport agent having a base of a fire-extinguishing agent also has independent importance within the scope of the invention. With respect to the use in connection with an electric heating or else electric night storage heating, an advantageous development is provided in which the latent heat storage medium can be directly heated electrically. This can be done by electric conductors, for instance bare wires, which pass through the latent heat storage medium. For example, the aforementioned grid can also be used for this purpose. Of further importance there is also an embodiment in which the storage chamber—possibly together with an adjacent traditional convection heater—can be acted on by a blower (blower convectors). In this way, it may, for instance, be possible to deliver larger amounts of heat within a short period of time, for instance when rapid heating of a room is desired.

Another independent idea which is of particular importance within the scope of the invention, in particular also in combination with a storage chamber such as described above, concerns the development of the latent heat storage medium having a base of paraffin. A latent heat storage medium having a base of paraffin with a narrow C-chain range can lead in a short time to very high strains on the material of the heater construction as a result of the high contraction and expansion of volume occurring upon a change in temperature. For the dependable use of this phenomenon, a mixture of paraffin hydrocarbons of different grade has surprisingly been found satisfactory. The latent heat storage medium can be formed preferably of a mixture of paraffin hydrocarbons of different melting points. Such a latent heat storage medium has the surprising advantage that the expansion in volume or reduction in volume given upon a solid/liquid transition is very slight. This is of substantial importance for the desired high degree of filling of the storage chamber. Furthermore, in hand with this, a gradual, unimpeded continuous melting process is made possible. Overheated, low-melting structures further increase the heat transfer capacity and thus shorten the melting time (structures which are still solid are surrounded and acted on convectively by liquid structures and thus melted faster). In detail, it is preferable in this connection that about 60 or more per cent by volume of the latent heat storage medium (the total volume) be present in the main operating range of the heater, i.e. in the temperature range with respect to the phase conversion which is selected for the heater, and that up to 30%, and preferably up to 25%, of the volume of the latent heat storage medium has a melting point which is 1 to 10° K. below the melting point of the largest portion of the mass. The largest portion of the mass and therefore that mentioned above with 60 or more per cent by volume, defines by its melting point the main operating range, which actually always contains a temperature range even though a small one. Furthermore, up to 30 per cent by volume, and preferably up to 25% by volume of the latent heat storage medium can be provided with a melting point which is up to 25° K., preferably up to 22° K., below the melting point temperature of the largest portion of the latent heat storage medium and therefore up to 22 or 25° K. below the temperature which characterizes the main operating range. In addition to portion of up to six per cent by volume of the mass of the latent heat storage medium introduced, namely paraffin hydrocarbons of crystalline structure, can have a melting point of 25 to 40° K. or, alternatively, up to 35° K. above the temperature of the main operating range. Furthermore, up to one per cent by volume of a polymer additive can also be provided. In detail, this may be a structure additive from the group of compounds consisting of polyalkylmethacrylates, polyalkylacrylates, ethylenepropylene copolymers, or alkylated naphthalenes.

One composition, by way of example, of the latent heat storage medium is as follows:

50 vol (volume) % up to 25 vol% of a paraffin hydrocarbon mixture in the melting range of 56° C. to 58° C.

25 vol% of a paraffin hydrocarbon mixture in the melting range of 52° C. to 54° C.

20 wt.% of a paraffin hydrocarbon mixture in the melting range of 42° C. to 44° C.

4.9 wt.% of a paraffin hydrocarbon mixture in the range of 69° C. to 73° C.

0.1 vol% of a structure additive of the class of compounds of polyalkylmethacrylates.

The latent heat storage medium described above is of importance also in the case of other latent heat storages, for example, in the latent heat storage described in the aforementioned German patent application P 43 07 065.5. In addition, in a latent heat storage such as described in German patent application P 43 42 020.6, the content of the aforementioned patent application is incorporated by reference in the present application particularly also with respect to the use of latent heat storage medium in accordance with the above description in the manner that these latent heat storages are also described in the present application in combination with a latent heat storage medium such as described above.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
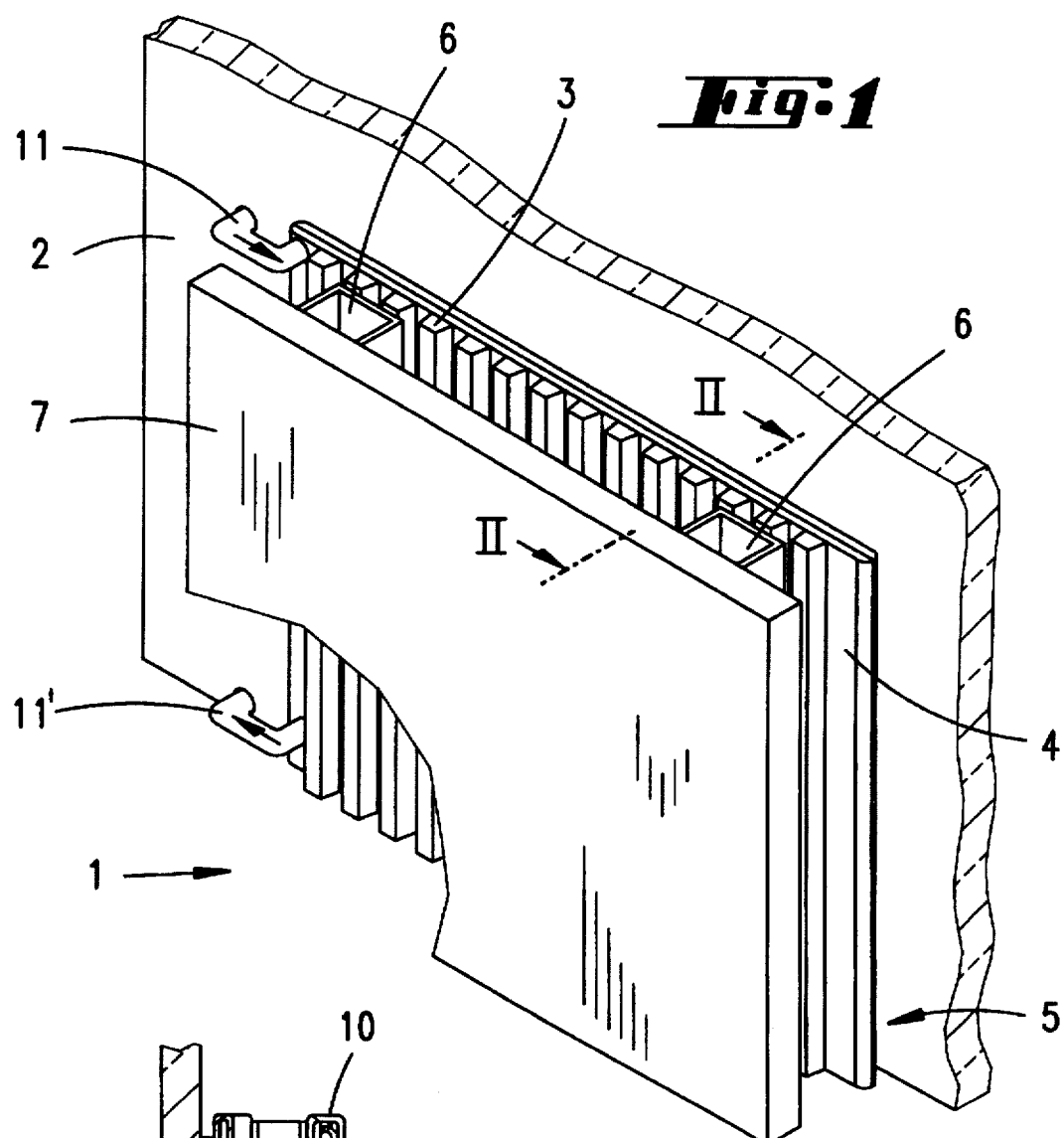
FIG. 1 is a perspective view of a heater with storage chamber.
Figure 2:
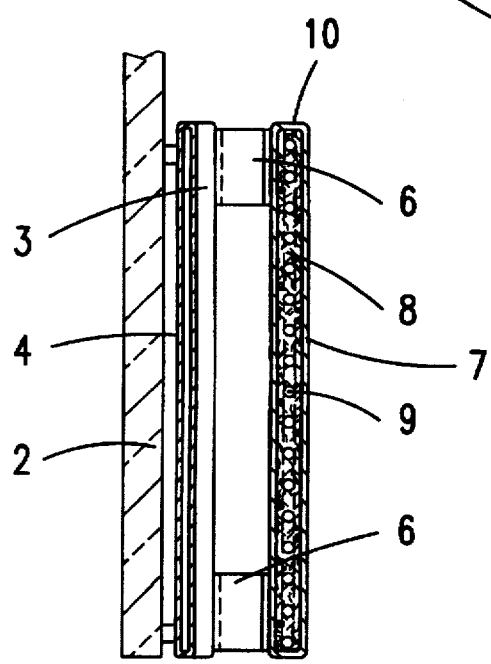
FIG. 2 is a cross section through the heater of FIG. 1, the section being taken along the line II—II.

Referring first of all to FIG. 1 there is shown and described a heater 1 which is arranged on a wall 2, for instance in a room of a residence. The heater 1 has a convection surface 3 which, in the embodiment shown, is formed by a U-shaped sheet of metal which is applied to one surface 4 of the plate heater element 5. On the convection surface 3, there is furthermore fastened, via two U-shaped metal sheets 6, a storage chamber 7 which has a separate, closed chamber in which a latent heat storage medium 8 (see FIG. 2) is contained. It can be seen that the storage chamber 7—in its rearward association with the surface 3—is in radiation heat exchange with the convection surface 3. In addition to this, there is, of course, also a certain convective heat transfer to the storage chamber 7 by the air flowing between the storage chamber 7 and the convection surface 3.

In detail, the storage chamber 7 is developed as a static or dynamic latent heat storage. For further explanation, reference is had to the literature mentioned above. Within the storage chamber 7 there is arranged a wire grid 9, merely indicated in FIG. 2, which, on basis of its thermal conductivity, in particular assures a better heat transport into the inside of the storage chamber 7. The wire grid 9 is connected in its edge regions to the metal wall 10 of the storage chamber 7.

Figure 3:
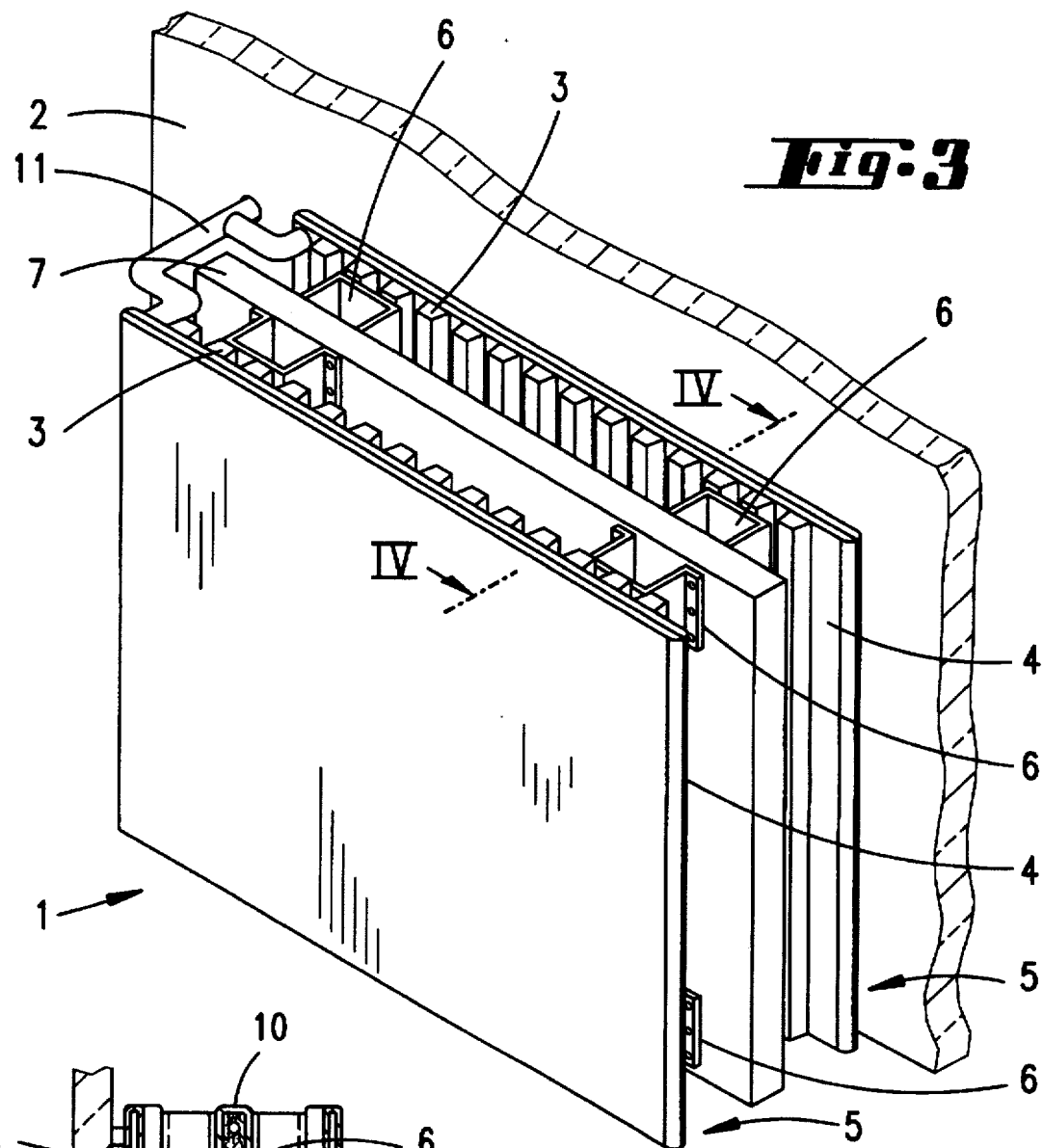
FIG. 3 is a further embodiment of the storage of a heater with storage chamber, with the storage chamber arranged between two plate heater elements.

In the embodiment shown in FIG. 3, substantially the same conditions are present as described with reference to FIG. 1. Only in this case the plate heater element 5 is provided twice and the storage chamber 7 is arranged between the two plate heater elements 5.

Figure 4:
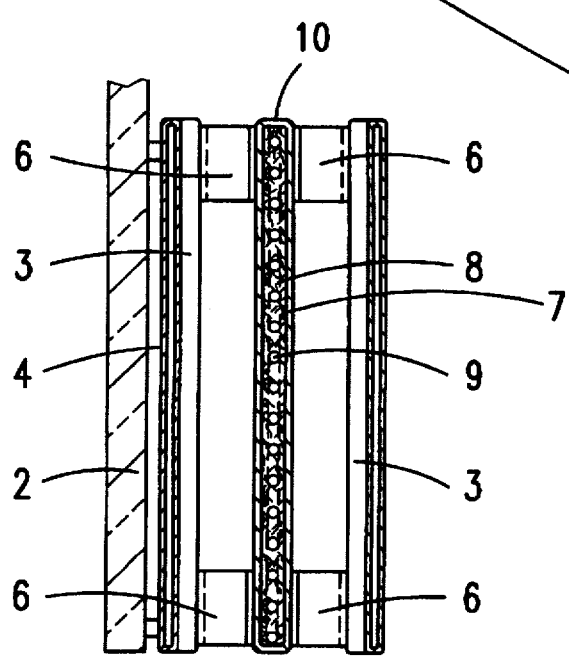
FIG. 4 is a cross section through the heater of FIG. 3, shown in section along the line IV—IV.

FIG. 4 shows a corresponding cross-sectional view.

Figure 5:
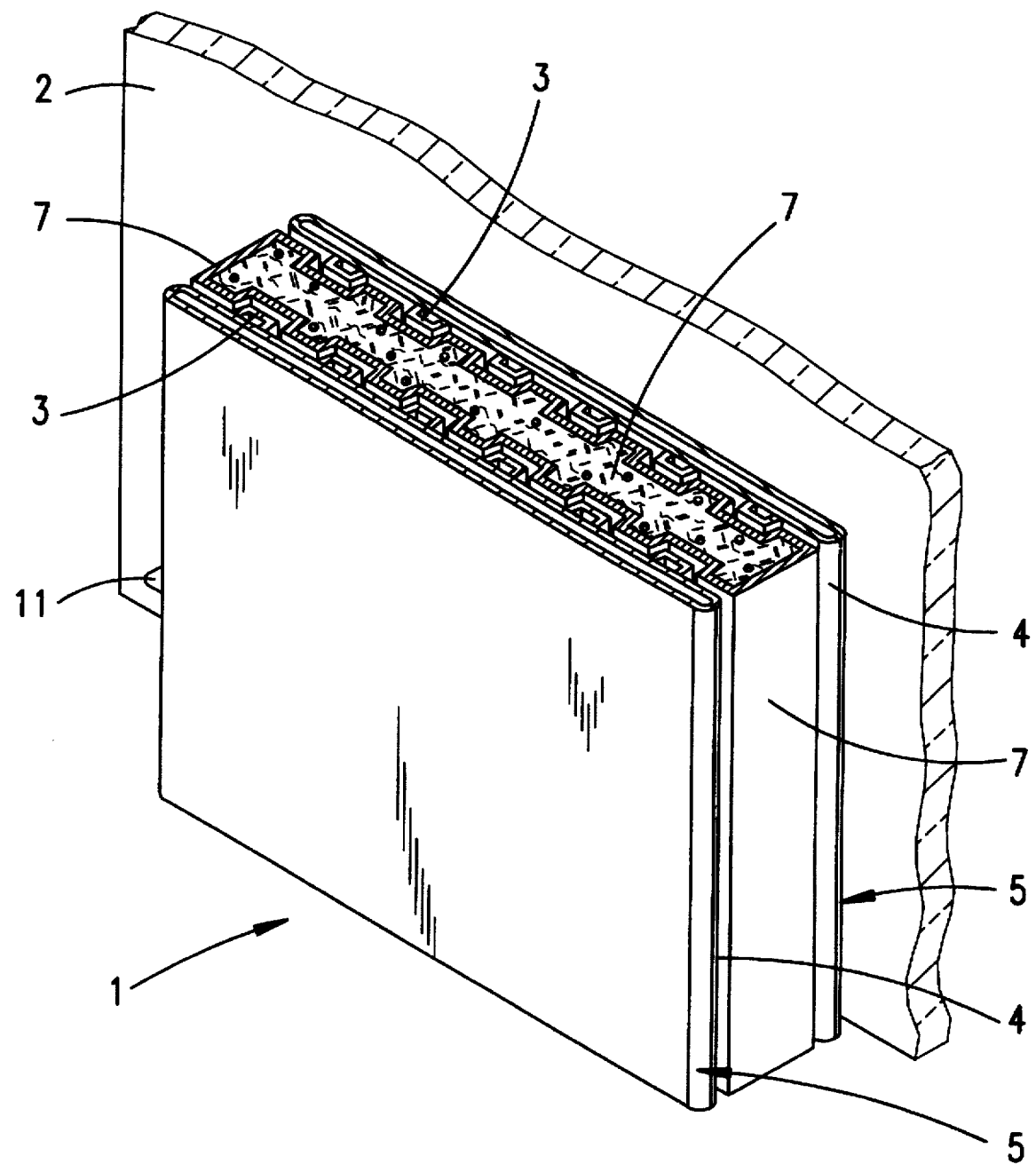
FIG. 5 is a perspective view, partially in longitudinal section, of another embodiment of a heater with storage chamber, the shape of the storage chamber being adapted to convection surfaces of the heater.

Substantially the same conditions are present also in the case of a heater in accordance with FIG. 5. Only in this case it is furthermore provided—which is also of particular importance in the case of the invention—that the storage chamber 7 is geometrically adapted to the convection surfaces 3 of the plate heater element 5. In this way, due to the possible small slot between the storage chamber 7 and the plate heater elements 5 there is furthermore improved radiation heat exchange to the storage chamber 7.

Furthermore, it can be seen, for instance from FIG. 1, that the parts of the heater 1 which are traversed by water are connected in customary manner via pipes 11, 11'—possibly with forward and return travel—to the water system of the household heating. In the case of a heater for hot-water heating there is provided an inlet opening 11 and an outlet opening 11' of a water chamber.

Figure 6:
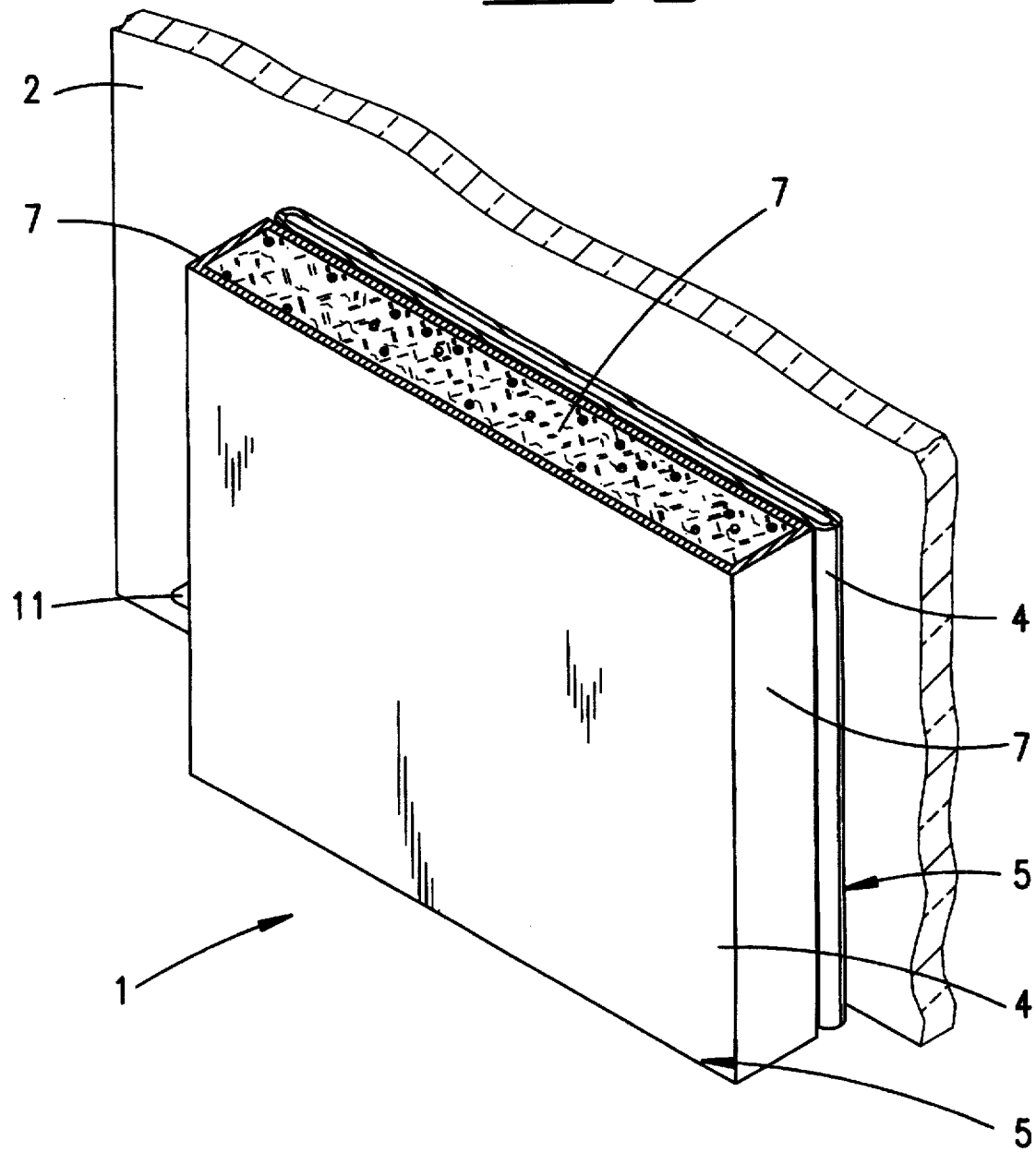
FIG. 6 is a showing in accordance with FIG. 5 in which the latent heat storage is arranged in direct surface contact with a plate heater element.

From FIG. 6 it can be noted that the storage chamber 7 of the latent heat storage is arranged in direct surface contact with an outer surface (room side) of the plate heater element 5. The heat transfer takes place by heat conduction through the walls of the storage element and plate heater element which rest against each other.

As can be noted in particular also from FIG. 5, the storage chamber 7 can be manufactured as a supplemental part which can be inserted or hung between two plate heater elements 5. It is preferable in this connection if the storage element can be arranged, seen from the room side, behind a plate heater element 5. The invention is, in particular, also of importance with respect to a retrofit element for existing heaters, in which case such a storage chamber 7 is adapted as retrofit element to existing profiles of plate heaters, for insertion/hanging.

We claim:

1. A latent heat storage medium comprising
a base of paraffin hydrocarbons, the latent heat storage medium being formed of a mixture of the paraffin hydrocarbons, of different grade, of different melting points, wherein, up to about 30% of the volume of the latent heat storage medium has a melting point which is up to about 25° K. below a main operating range of the latent heat storage medium, said main operating range being defined by the melting point of a largest portion of the mass of the latent heat storage medium with at least about 60 per cent by volume of the latent heat storage medium, there being a reduction of strain on material of a storage chamber filled with the latent heat storage medium resulting from slight contraction and expansion in volume occurring upon passing through melting point temperature phase conversion.

2. A latent heat storage medium according to claim 1, wherein up to about one-fourth of the volume of the latent heat storage medium has a melting point which lies about 1 to 10° K. below the melting point of said largest portion.

3. A latent heat storage medium according to claim 1, wherein up to about 6% of the volume of the latent heat storage medium has a melting point of about 25 to 40° K. above the main operating range.

4. A latent heat storage medium according to claim 1, wherein up to about 1% of the volume of the latent heat storage medium is a polymer additive.

5. A latent heat storage medium according to claim 4, wherein the polymer additive is a compound selected from the group of compounds consisting of polyalkylmethacrylates, polyalkylacrylates, ethylene-propylene copolymers, and alkylated naphthalenes.

6. A latent heat storage medium according to claim 1, wherein the melting point of the main operating range has a small temperature range.

7. A latent heat storage medium according to claim 6, wherein said small temperature range is about a few degrees C.

8. A heater for use in a room of a dwelling, comprising
a first heater having a convection surface and, wherein
the first heater provides hot-water heating, and has a water chamber having an inlet opening and an outlet opening, and
a second heater having a closed storage chamber containing the latent heat storage medium according to claim 1, the storage chamber being heatable by radiation heat or convection heat from said convection surface of said first heater and, in case of convection heat, forming with said water chamber an intermediate open space, enabling a flow of air between the water chamber and the storage chamber.

9. A heater according to claim 8, wherein said closed storage chamber containing said latent heat storage medium is arranged on a room side with respect to the water chamber and in surface contact therewith.

10. A heater according to claim 8, wherein the storage chamber with said latent heat storage medium comprises a static latent heat storage.

11. A heater according to claim 8, wherein the storage chamber with said latent heat storage medium comprises a dynamic latent heat storage.

12. A heater according to claim 8, further comprising a heat-conductive grid which is connected to chamber walls of the storage chamber and is arranged within the storage chamber.

13. A heater according to claim 8, wherein the storage chamber geometrically substantially conforms to the shape of said convection surface of the first heater.

14. A heater according to claim 8, wherein said first heater further comprises another convection surface spaced from said first-mentioned convection surface, and wherein the storage chamber is arranged between both of said convention surfaces of the first heater.

15. A heater according to claim 8, wherein the storage chamber is formed as a plate body.

16. A heater according to claim 8, further comprising a heat transport agent having a base of a fire-extinguishing agent contained in the latent heat storage medium.

17. A heater according to claim 16, wherein up to about 6% of the volume of the latent heat storage medium has a melting point of about 25 to 40° K. above the main operating range of the latent heat storage medium.

18. A heater according to claim 16, wherein up to 1% of the volume of the latent heat storage medium is a polymer additive.

19. A heater according to claim 18, wherein the polymer additive is a compound selected from the group of compounds consisting of polyalkylmethacrylates, polyalkylacrylates, ethylene-propylene copolymers and alkylated naphthalenes.

20. A heater according to claim 12, wherein the grid is a metal grid.

21. A heater for use in a room of a dwelling, comprising
a first heater adapted to be heated, and
a second heater having a closed storage chamber containing the latent heat storage medium according to claim 1, the storage chamber being heatable by said first heater.

22. A heater according to claim 21, wherein up to about one-fourth of the volume of the latent heat storage medium has a melting point which lies about 1 to 10° K. below the melting point of said largest portion, and wherein up to about 6% of the volume of the latent heat storage medium has a melting point of about 25 to 40° K. above the main operating range of the latent heat storage medium, and wherein the melting point of the main operating range has a small temperature range of about a few degrees C.

* * * * *